COMMUNICATIONS SYSTEM CHECKING APPARATUS
Filed March 8, 1951
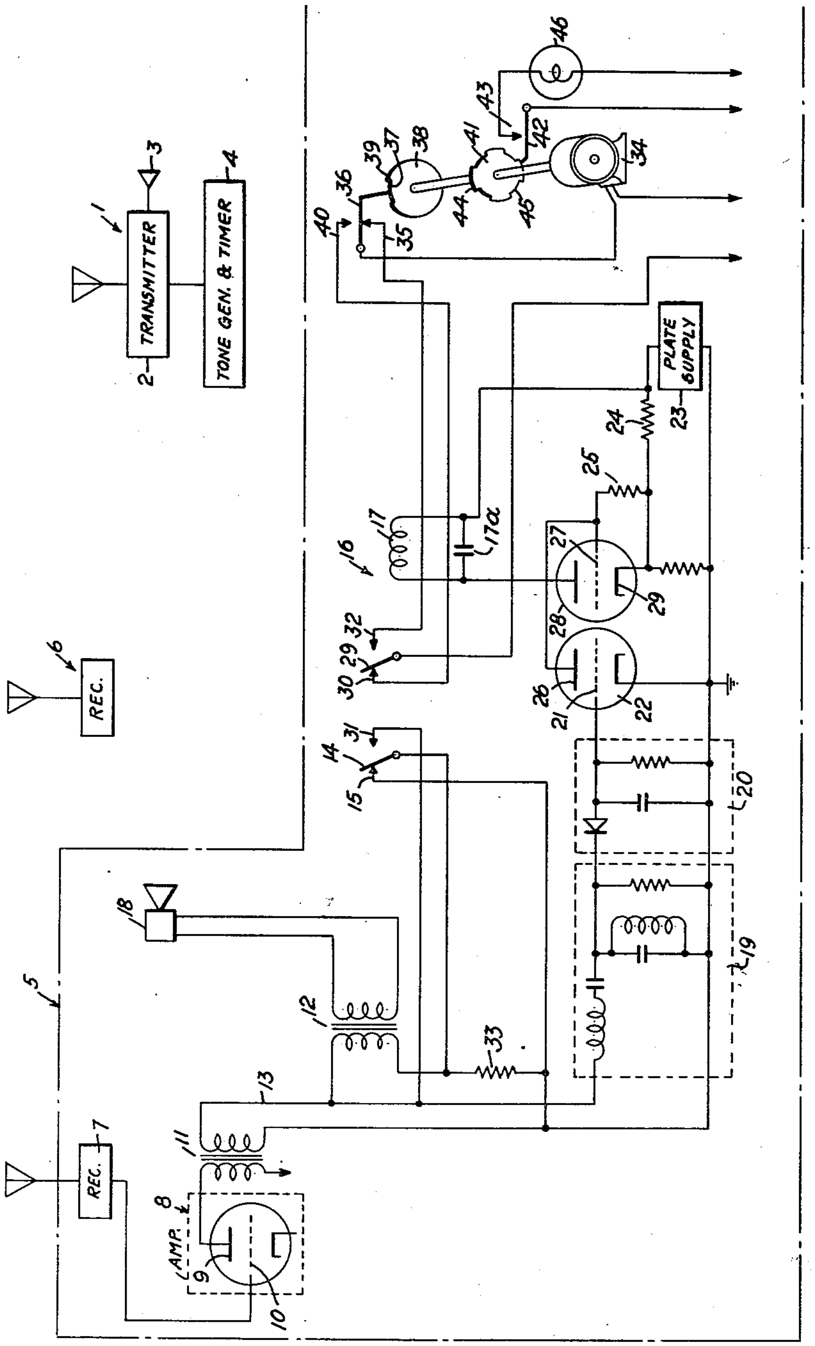
INVENTOR
ROBERT W. HALE
BY [signature]
ATTORNEY 2,773,977

COMMUNICATIONS SYSTEM CHECKING APPARATUS

Robert W. Hale, Fort Wayne, Ind., assignor to International Telephone and Telegraph Corporation, a corporation of Maryland Application March 8, 1951, Serial No. 214,451

6 Claims. (Cl. 250—6)

This invention relates to radio communications systems and in particular relates to checking apparatus for radio communications systems of the general type wherein orders or other signals are sent from a master station to one or more subsidiary stations.

An example of a system to which this invention relates is disclosed for example in U. S. Patent No. 2,433,281 entitled "Radio Communication Checking System" granted December 23, 1947 to B. C. Lord. The checking system of the above referred to patent involves the periodic transmission of checking signal pulses of modulated carrier from the master station of the radio communications system. Visual and aural indications of the reception of each checking signal is provided in the subsidiary station within the signal zone. Absence of a checking signal indicates that signals are not being received either because of failure at the transmitter or in the receiver, so that precautionary measures may be taken at the auxiliary station. The manner of indication of proper reception of the checking signals is the flash of a lamp or the presence of a signal in a loudspeaker or both for each signal. The repetition rate of the checking signal pulses is kept relatively low so that maximum "break-in" time is allowed for a subsidiary station to call the master station resulting in relatively long periods of no indication between reception of checking pulses.

Systems have been proposed to provide continuous indication during the interval between checking pulses of the proper reception of the checking signal by providing steady light or absence thereof during the period between checking pulses for indication. The shortcoming of these types of systems is that the sticking of a relay or the failure of a similar component in the subsidiary station receiver provides false indication that the system is operating properly.

In the present invention the checking signal pulses if properly received in the audio output circuit of a receiver of a subsidiary station actuates a relay circuit. The relay circuit starts a motor driven cam switch which causes a light to flash on and off during the interval between the pulses. The motor comes to a stop before the next pulse is received and the cam switch is in a position for the light to be either on or off but not flashing. On receipt of the next checking pulse from the master station the cycle is repeated. A maximum of open circuit time is afforded to receive transmissions from the subsidiary stations by using a low repetition rate of pulse transmission.

It is therefore an object of this invention to provide a novel checking means for communication systems which continuously indicates in a positive manner a failure of any part of the system including the checking apparatus.

The receiver of a communications system according to a feature of my invention employs an indicating device arranged to be continuously operated upon proper reception of periodic signal modulated waves by said receiver.

The above-mentioned and other features and objects of this invention and the manner of attaining them will become more apparent and the invention itself will be best understood by reference to the following description of an embodiment of the invention taken in conjunction with the accompanying drawings, the single figure of which shows a schematic diagram of arrangement according to this invention adapted to be incorporated into a receiver of a communications system.

Turning to the drawing, the master transmitter station is shown at 1. This station includes a transmitter 2 which may be voice modulated by signals applied through a microphone 3, and tone modulated by pulses from the tone generator and timer 4. In the transmitter 1 means may be provided to disconnect generator 4 while signals are being sent over microphone 3. The timer in generator 4 is adjusted to apply tone pulses to transmitter 1 at relatively long intervals so as to provide a maximum break-in time for voice signals.

A plurality of receivers shown at 5 and 6 are provided to receive the test pulse signals and communication signals originated at transmitter 1. Each of the receivers is provided with a circuit to be energized by the test pulse signals at times communications are not being transmitted to indicate that the receiver and transmitter are operative.

Each receiver which may be provided with a circuit as shown in detail at receiver 5 is to be called from the master station. Energy from master station 1 is applied to the receiver 7 where it is demodulated and applied to electron tube 8 which may be the final stage.

Only the output electrode 9 and input grid 10 are shown, as the type of tube used is unimportant. Power amplifier 8 is coupled through an output transformer 11 to loudspeaker transformer 12 over lead 13 and back contacts 14 and 15 of relay 16 having a winding 17. Audio frequency speech transmissions are impressed on the loudspeaker 18 over the transformer 12.

A band pass filter 19 applies only tone modulated signals used for checking to the demodulator 20. The frequency of the modulation of these signals may best be at the high end of the audio frequency range used in the communications systems of which the receiver is a part. This enables more satisfactory demodulating and filtering. The band pass filter 19 substantially passes only the frequency of the checking signals.

The checking signals are of short duration and may be transmitted from transmitter 2 and the accompanying tone generator and timer 4 of the master station at regular intervals of primarily the order of ten seconds apart. This allows maximum open circuit time for an operator of a secondary station to call the control station.

A rectified checking signal appears at grid 21 of electron tube 22 as a negative potential cutting the tube off. Normally electron tube 22 is conducting and current is applied from the plate supply 23 through resistors 24 and 25 to the anode 26. Normally the potential drop across resistors 24 and 25 is large enough to bring the control grid 27 of electron tube 28 far below that of cathode 29, allowing tube 28 to be cut off. However, when electron tube 22 is cut off as result of the presence of a checking signal, electron tube 28 becomes conducting since very little current flows through resistors 24 and 25 and the potential of grid 27 is not lowered to cut off.

The relay 16 is energized when the electron tube 28 conducts whereby contactors 14 and 29 are moved from their respective contacts 15 and 30 and make contact with front contacts 31 and 32 respectively. For the duration of the checking signal pulse, relay 16 is energized and the primary of transformer 12 is short-circuited through contacts 14 and 31 of relay 16 and the resistor 33 of comparable impedance to the primary winding absorbs the audio frequency energy. There is sufficient delay in the operation of relay 16 so that a short pulse of audible tone is heard from the loudspeaker 18. This provides an audio indication of the presence of checking signals.

For the period of the energization of relay 16, motor power is supplied to motor 34 through contacts 29 and 32 and lower contacts 35 of cam follower 36 which rests on the lesser diameter portion 37 of cam 38. The motor 34 turns far enough during the period of the checking pulse for cam follower 36 to ride onto the large circumference 39 of the cam 38 making electrical contact between cam follower 36 and upper contact 40.

As relay 16 also controls, by the operation of contacts 14, 15, and 31, the supply of energy to loudspeaker 18, it is desirable to have the relay slow to release in order that the receiver squelch circuit can regain squelch quieting action and thus avoid annoying squelch noise or "tails" in the loudspeaker. This may be accomplished by connecting a condenser **17*a* across relay winding 17**.

The speed of rotation of the motor 34 and the length of the indentation 37 of the cam 38 are such as to allow the cam follower 36 to make contact with contact 40 at the same moment the checking pulse ends. The motor 34 continues to receive power but through contacts 29 and 30 of relay 16 and contact 40 and cam follower 36. The motor receives power in this manner for substantially one rotation of the motor, until the cam is rotated far enough to allow the cam follower 36 to drop again into the indentation 37 causing cam follower 36 to break contact with contact 40 again closing with lower contact 35 so as to be ready for the next checking signals.

In practice the interval between checking signals is just sufficient to allow the cam 38 to be turned around a full revolution before a new signal appears resulting in a new cycle.

The motor 34 also rotates pulsing cam 41 mounted on the same shaft as cam 38. Cam follower 42 makes and breaks contact with contact 43 as it rides on the poles 44 and indentation 45 of cam 41. The indicator lamp 46 winks on and off as contact 42 and cam follower 43 make and break connection, producing flashes during the intervals between check signals.

Failure of relay 16 in this circuit may result in the motor stopping in such a position that cam follower 36 is either making contact with contact 35 or 40. However, the light under those circumstances remains either off or on depending on the rotary position of cam 41. For the indicator lamp to continually blink on and off the relay circuits must be operating properly. This provides a positive indication that the entire system is working properly.

In operation the motor 34 becomes disconnected from its source of power after it turns a predetermined amount allowing the contact between contact 40 and cam follower 36 to break. After the motor becomes disconnected, it coasts a small distance allowing the cam follower 36 to ride on the indentation 37 a short distance. At the time the motor coasts to a stop, the cam follower 36 is making contact with contact 35 and the system is reset for recycling by the next checking pulse.

The length of the poles on the cam 41 is preferably such that the off and on periods of the switching of contacts 42 and follower 43 are equal. On that portion of the cycle that the motor coasts the poles may be shorter so that the resulting flashing of the indicator lamp 46 is evenly spaced.

While a particular example of this invention has been illustrated, it will be clear to those skilled in the art that many modifications may be made without departing from the scope of this invention.

While I have described above the principles of my invention in connection with specific apparatus, it is to be clearly understood that this description is made only by way of example and not as a limitation to the scope of my invention.

What is claimed is:

1. A receiver for receiving communication signals and periodic checking pulses of a predetermined time spacing received during intervals when communication signals are not being received, comprising means for separating said pulses, a relay momentarily operative in response to said pulses, a motor, contacts closed in response to operation of said relay for initiating movement of said motor, a shaft rotatable by said motor, a cam on said shaft, contact means operated by said cam for closing an operating circuit for said motor and for opening said cam operated contacts upon a predetermined interval of rotation of said motor to stop said motor, an indicating device circuit, means mounted on said shaft for intermittently closing said indicating device circuit a plurality of times during said interval of rotation and an indicating device in said indicating device circuit.

2. A receiver according to claim 1 wherein said means for intermittently closing said circuit comprises a cam having a plurality of operating surfaces, and a switch closed by said operating surfaces.

3. A receiver for receiving communication signals and periodic checking pulses of a predetermined time spacing received during intervals when communication signals are not being received, comprising a relay momentarily operative in response to said pulses, a motor, contacts closed in response to operation of said relay for initiating movement of said motor, a shaft rotatable by said motor, a cam on said shaft, contact means operated by said cam for closing an operating circuit for said motor and for opening said operating circuit upon a predetermined interval of rotation of said motor to stop said motor, an indicating device circuit, means mounted on said shaft for intermittently closing said indicating device circuit a plurality of times during said interval of rotation, and an indicating device in said indicating device circuit.

4. For use in a receiving system for receiving communication signals and periodic checking pulses of a predetermined time spacing received during intervals when communication signals are not being received, checking apparatus comprising switch-operating means operative in response to said pulses to control the opening and closing of first switch means, motor means operatively coupled to said switch means for controlling the starting of operation of the motor means, second switch means operatively dominated by said motor means and serving to stop operation of said motor means after a predetermined period of time, means for alternatively operating said first and second switch means, and indicator means operatively connected to said motor means and operative to indicate operation of said motor means.

5. For use in a receiving system for receiving communication signals and periodic checking pulses of a predetermined time spacing received during intervals when communication signals are not being received, checking apparatus comprising control means operating through a complete cycle in response to each of said pulses received, motor means controlled by said control means, said control means serving to start operation of said motor means, said motor means having an operating cycle which is longer in duration than the operating cycle of said control means, means for stopping said motor means at the end of its cycle, and indicator means operatively connected to said motor means.

6. A receiver for receiving communication signals and periodic checking pulses of a predetermined time spacing received during intervals when communication signals are not being received, comprising control means operating through a complete cycle in response to each of said pulses received, motor means controlled in operation by said control means, said control means serving to start operation of said motor means, said motor means having an operating cycle which is longer in duration than the operating cycle of said control means, means for stopping said motor means at the end of its cycle and indicating means operated by said motor means for the duration of the operating cycle thereof.

References Cited in the file of this patent

UNITED STATES PATENTS

| | | |
|---|---|---|
| 1,662,877 | Almquist | Mar. 20, 1928 |
| 1,749,444 | Rae | Mar. 4, 1930 |
| 2,277,469 | Whitelock | Mar. 24, 1942 |
| 2,280,420 | Chappel | Apr. 21, 1942 |
| 2,280,421 | Chappel et al. | Apr. 21, 1942 |
| 2,433,281 | Lord | Dec. 23, 1947 |
| 2,459,105 | Halstead | Jan. 11, 1949 |
| 2,501,091 | Preston et al. | Mar. 21, 1950 |